United States Patent
Meyerzon et al.

(10) Patent No.: US 6,631,369 B1
(45) Date of Patent: Oct. 7, 2003

(54) METHOD AND SYSTEM FOR INCREMENTAL WEB CRAWLING

(75) Inventors: Dmitriy Meyerzon, Bellevue, WA (US); Srikanth Shoroff, Issaquah, WA (US); F. Soner Terek, Bellevue, WA (US); Sankrant Sanu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/345,040

(22) Filed: Jun. 30, 1999

(51) Int. Cl.[7] .............................................. G06F 17/30
(52) U.S. Cl. ............................................. 707/4; 707/10
(58) Field of Search ............................ 707/5, 10, 200, 707/511, 4; 709/218–219, 203, 313, 229; 370/410

(56) References Cited

U.S. PATENT DOCUMENTS

| | | | | |
|---|---|---|---|---|
| 5,530,848 A | * | 6/1996 | Gilbert et al. | 709/313 |
| 5,813,008 A | | 9/1998 | Benson et al. | 707/10 |
| 6,012,087 A | * | 1/2000 | Freivald et al. | 709/218 |
| 6,236,661 B1 | * | 5/2001 | Ballard | 370/410 |
| 6,418,452 B1 | * | 7/2002 | Kraft et al. | 707/200 |

OTHER PUBLICATIONS

Michael F. Schwartz and Calton Pu Titled "Applying an information gathering architecture to Netfind: a white pages tool for a☐☐ changing and growing Internet" 1063Y6692194 @ 1994 IEEE.*

Obraczka, K.; Danzig, P.B.; Li, S.–H. Titled "Internet resource discovery serives "0018–9162/93/0900–0008 @ 1993 IEEE.*

* cited by examiner

*Primary Examiner*—Diane D. Mizrahi
(74) *Attorney, Agent, or Firm*—Woodcock Washburn LLP (57) ABSTRACT

A Web crawler creates an index of documents in a document store on a computer network. In an initial crawl, the crawler creates a first full index for the document store. The first full crawl is based on a set of predefined "seed" URLs and crawl restrictions, and involves recursively retrieving each folder/document directly or indirectly linked to the seed URLs. In the process of creating the first full index, the crawler creates a History Table containing a list of URLs for each folder and document found in the first full crawl. The History Table also includes a local commit time (LCT) for each document and a deleted documents count (DDC) and LCT or maximum LCT (MLCT) for each folder (this assumes that the store supports a folder hierarchy and the MLCT, LCT and DDC properties). Thereafter, in an incremental crawl, the crawler determines, for each folder, (1) whether the DDC for that folder has changed and (2) whether the MLCT is more recent than the corresponding value in the History Table. If the DDC has changed, the crawler obtains a full list of items (URLs) in that folder, and compares the list with the URLs in the History Table to identify the deleted documents. The deleted documents are then deleted from the History Table and index. If the MLCT is more recent, the crawler queries the document store for the URLs of linked documents having a LCT more recent than the MLCT in the History Table for the folder. The History Table and index are then updated accordingly to reflect the changes to the document store.

23 Claims, 4 Drawing Sheets

METHOD AND SYSTEM FOR INCREMENTAL WEB CRAWLING

CROSS REFERENCE TO RELATED APPLICATIONS

The present invention is related to the subject matter of co-pending application Ser. No. 09/343,511, filed on Jun. 30, 1999, entitled "Method and System for Detecting Duplicate Documents in Web Crawls," which is hereby incorporated by reference.

TECHNICAL FIELD

The present invention relates generally to the fields of computerized publishing and knowledge management, and more particularly to Web crawler applications used, e.g., by Internet search engines. The invention, however, is not limited to use in a Web crawler. On the contrary, the invention could be used in a mail server, directory service, or any system requiring indexing or one-way replication of a document store.

BACKGROUND OF THE INVENTION

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol.

The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents. The referenced documents may represent text, graphics, or video.

A Web browser is a client application or, preferably, an integrated operating system utility that communicates with server computers via FTP, HTTP and Gopher protocols. Web browsers receive electronic documents from the network and present them to a user.

An intranet is a local area network containing Web servers and client computers operating in a manner similar to the World Wide Web described above. Typically, all of the computers on an intranet are contained within a company or organization.

The term "search engine" is often used generically to describe both true search engines and directories, although they are not the same. Search engines typically create their listings automatically by "crawling" the Web. A directory, on the other hand, depends on humans for its listings, i.e., a person submits a short description for an entire site or editors write a description for sites they review. The present invention is particularly suited (although not necessarily limited) for use in a search engine of the type that gathers information automatically, i.e., by "crawling" the Web.

Search engines typically include a "crawler" (also called a "spider" or "bot") that visits a Web page, reads it, and then follows links to other pages within the site. The crawler returns to the site on a regular basis to look for changes. Everything the crawler finds goes into an index, which is another part of the search engine. The index may be viewed as a file or container holding a copy of every Web page that the crawler finds. The primary purpose of the index is to provide a way to quickly look up a document URL based on words specified in a query. If a Web page changes, then the index is updated with new information. The search engine software, which is yet another part of the search engine, is a program that sifts through the pages recorded in the index to find documents fulfilling a search query submitted by a user. The search engine software will typically rank the matches in accordance with their relevance.

Once it is given a set of start addresses and restriction rules, a crawler can retrieve documents following all recursive links from the documents that correspond to the start addresses that pass the restriction rules. For example, a crawler may recursively follow all links from the documents that correspond to specified start addresses, limiting the URL space by filtering out those that do not pass the specified crawl restriction rules. The primary application of the crawler is to build an index of a set of documents, so that the index can be searched by end-users that want to locate documents that match certain search criteria.

A crawler can retrieve documents from different stores. Although the primary store is the Web, a crawler can retrieve documents from a mail store, database, or anything else that has textual content (but textual content is relevant only for processing of a document for the purpose of indexing, since the crawler itself is not concerned with about what type of document is being crawled).

Crawls typically are performed periodically to update the indexes with changed documents. Crawlers usually have no knowledge of the document store specifics. The only thing they can rely on is the last modified timestamp of the document, which is standard for most document stores, including HTTP servers, file servers, mail servers and databases. A problem with this approach is that, to ascertain the increment of the document set, the crawler must ask the corresponding server for each document whether the document's timestamp has changed. Since the percentage of documents that are unchanged between crawls is typically very high, it would be beneficial to minimize the number of requests the crawler makes to the document server to obtain the "increment" of the document set relative to the set of documents received during the previous crawl (i.e., to obtain new, modified and deleted documents). The present invention achieves this goal.

Further background information about Web crawlers is provided below, and may also be found in U.S. pending patent application Ser. No. 09/105,758, filed Jun. 26, 1998, "Method of Web Crawling Utilizing Crawl Numbers," and U.S. patent application Ser. No. 09/107,227, filed Jun. 30, 1998, and now U.S. Pat. No. 6,483,794 "Synchronizing Crawler With Notification Source."

SUMMARY OF THE INVENTION

This invention provides an improved mechanism for maintaining a document store in a manner that facilitates an efficient determination of whether and how the document store has been "incremented" or modified from a prior state.

For example, the invention could be used in a Web crawler application, mail server, directory service, or any system requiring indexing or one-way replication of a document store. The invention is particularly directed to a method and system for identifying documents in a document store that have changed, are new, or have been deleted.

The present invention utilizes a document store's ability to provide extra properties for each document folder. Such extra properties include, e.g., local commit time (LCT), maximum local commit time (MLCT) and deleted documents count (DDC). The crawler keeps track of local commit times per document URL. For folders, the crawler keeps the greater of the LCT and MLCT, as well as the DDC. It also keeps track of which URLs correspond to folders as opposed to documents, and for each URL it keeps the fact that a document was produced by the store that supports these extended properties (LCT, MLCT, and DDC). In an exemplary application of the present invention, a Web crawler creates an index of documents in a document store on a computer network, which may be an intranet, LAN or the Internet. In an initial crawl, the crawler creates a first full index for the document store. The first full crawl is based on a set of predefined "seed" URLs and crawl restrictions, and involves recursively retrieving each folder/document directly or indirectly linked to the seed URLs. In the process of creating the first full index, the crawler creates a History Table containing a list of URLs for each folder and document found in the first full crawl. The History Table also includes a LCT for each document and a DDC and LCT or MLCT for each folder. Flags are also included in the History Table to indicate which URLs have a corresponding DDC (i.e., which are folders) and which URLs have a parent with a corresponding DDC. Thereafter, in an incremental crawl, the crawler proceeds in accordance with the History Table (e.g., by starting at a first URL corresponding to a folder, as identified by the flag or bit mask, and continuing down through each folder URL) and determines (1) whether the DDC for that URL has changed and (2) whether the MLCT or LCT is more recent than the corresponding value in the History Table. If the DDC has changed, the crawler obtains a full list of items (URLs) in that folder, and compares the list with the URLs in the History Table to identify the deleted documents. The deleted documents are then deleted from the History Table and index. If the MLCT is more recent, the crawler queries the document store for the URLs of linked documents (i.e., linked to that folder) having a LCT more recent than the MLCT or LCT in the History Table for the folder. The History Table and index are then updated accordingly to reflect the changes to the document store.

In an exemplary implementation of the invention, if the document store does not support the LCT, MLCT and DDC properties, the crawler falls back to performing a normal incremental crawl with checking every document's timestamp. Also, a crawl can cover multiple stores, some of them supporting the extended properties, and some not. This means that the crawl history can be a mix of URLs from stores supporting or not supporting the extended properties. When doing an incremental crawl, the crawler iterates the history, and, for URLs produced from a store that supports extended properties, it only picks folders and performs the above-described procedure. Otherwise, if the store does not support the extended properties, it processes all URLs and checks their respective timestamps.

The invention avoids the need to check the time stamp for each and every document in the document store to identify changes to the document store. This dramatically improves the efficiency of incremental crawls and like processes that are used to manage document stores.

Other features of the present invention are described below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

The present invention provides a mechanism for obtaining information pertaining to electronic documents that reside on one or more server computers. While the following discussion describes an embodiment of the invention that crawls the Internet within the context of the World Wide Web, the present invention is not limited to that use. This present invention may also be employed on any type of computer network or individual computer having data stores for files, e-mail messages, databases and the like. The information from all such stores can be processed together or separately in accordance with the invention.

The present invention will now be explained with reference to a presently preferred embodiment thereof. An overview of Web crawler methods is provided first. After this overview, a description of exemplary computer and network environments is provided. Finally, a detailed description of the inventive method of incremental Web crawling using LCTs, MLCTs and DDCs is provided.

Overview of Web Crawler Methods

A server computer on the Internet is sometimes referred to as a "Web site," and the process of locating and retrieving digital data from Web sites is sometimes referred to as "Web crawling." Web crawling may entail initially performing a first full crawl wherein a transaction log is "seeded" with one or more document address specifications. (The term address specification, address specifier, and URL are used interchangeably in this specification. These terms refer to any type of naming convention that may be used to address a file, and are not intended to imply that the present invention is limited to Internet applications.) Each document listed in the transaction log is retrieved from its Web site and processed. The processing may include extracting the data from each of these retrieved documents and storing that data in an index, or other database, with an associated "crawl number modified" that is set equal to a unique current crawl number that is associated with the first full crawl. A hash value (such as MD5) for the document, the contents of the document and the document's time stamp may also be stored with the document data in the index. The document URL, its hash value, its time stamp, and its crawl number modified (i.e., the latest unique crawl number for which the document was detected to be substantially modified) may then be stored in a persistent History Table used by the crawler to record documents that have been crawled.

Incremental crawls or additional full crawls may be performed after the first full crawl. During a full crawl, the transaction log is seeded with one or more document address specifications, which are used to retrieve the document associated with the address specification. The retrieved documents are recursively processed to find any linked document address specifications contained in the retrieved document. The document address specification of the linked document is added to the transaction log the first time it is found during the current crawl. The full crawl builds a new index based on the documents that it retrieves based on the seeds in its transaction log and the gathering rules that constrain the search. During the course of the full crawl, the document address specifications of the retrieved documents are compared to associated entries in the History Table (if there are any entries). The reason for comparison is to determine whether the document has already been crawled during this crawl, since it is desirable to avoid the creation of infinite loops in the crawl by following the same links over and over.

An incremental crawl retrieves only documents that may have changed since the previous crawl. The incremental crawl uses the index and History Table and its transaction log is seeded with the document address specifications (URLs) contained in the History Table. In an incremental crawl, a document may be retrieved from a Web site (or any other site) if its time stamp is later than the time stamp stored in the History Table. This type of Web crawl is described in the above-cited U.S. pending patent application Ser. No. 09/105,758 ("Method of Web Crawling Utilizing Crawl Numbers").

To determine whether a substantive change has been made to the document, a Web crawler may filter extraneous data from the document (e.g., formatting information) and then compute a hash value for the remaining document data. The hash value would then be compared to a hash value stored in the History Table. Different hash values would indicate that the document has changed.

Computer Environment

Figure 1:
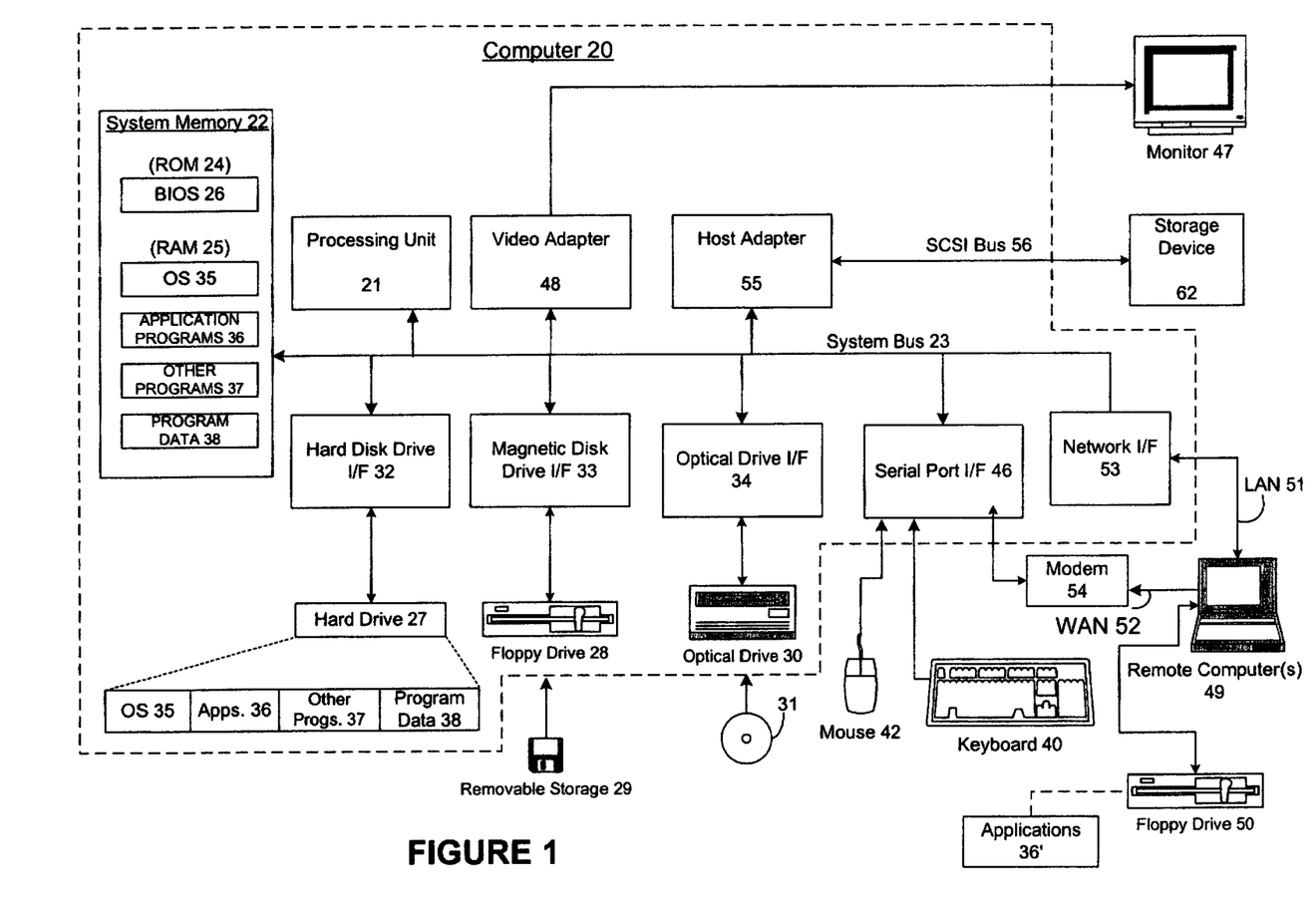
FIG. 1 is a block diagram representing a general purpose computer system in which aspects of the present invention may be incorporated.

Web crawler programs execute on a computer. FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
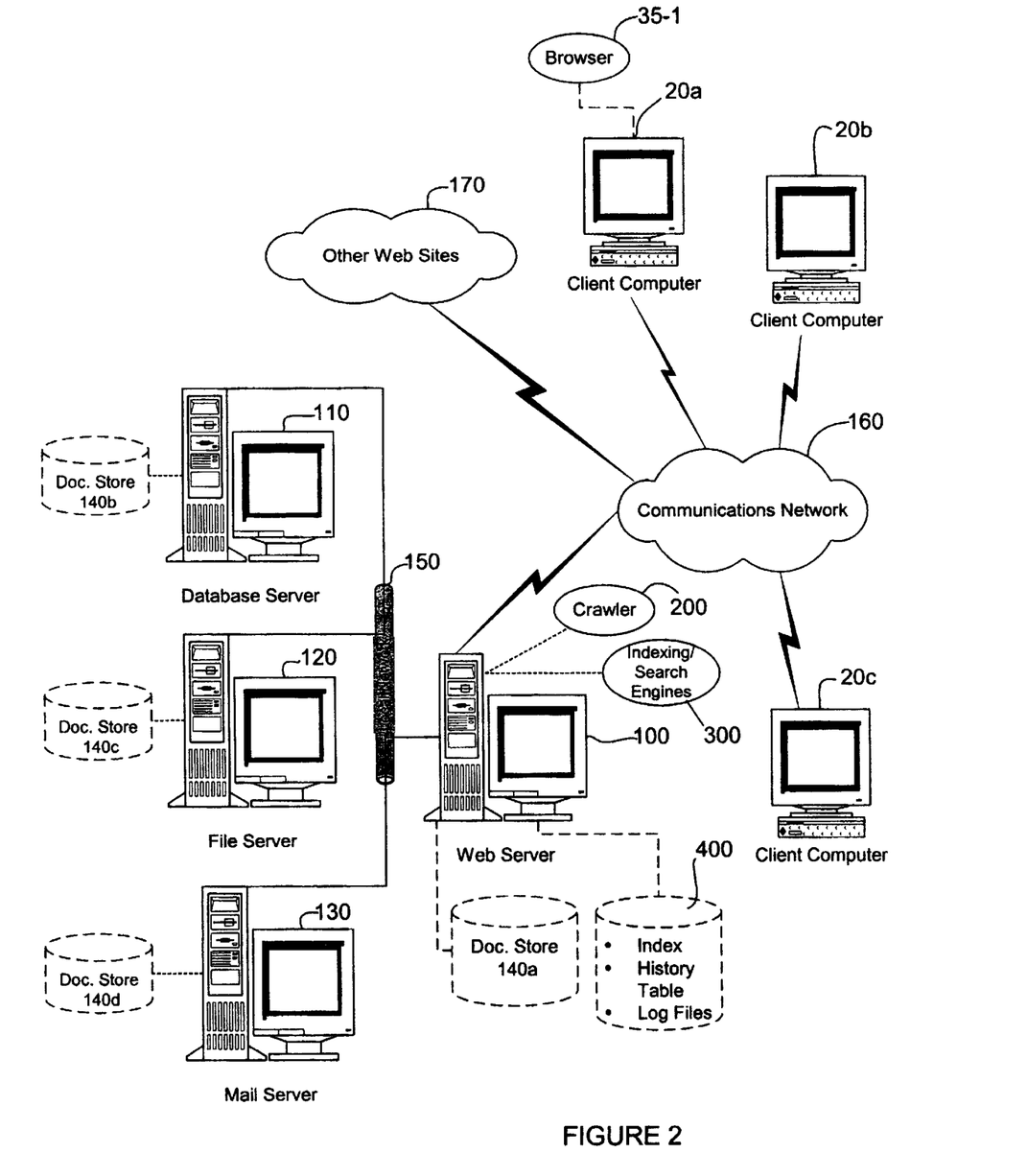
FIG. 2 is a schematic diagram representing a computer network in which aspects of the present invention may be incorporated.

As noted, the computer described above can be deployed as part of a computer network. In general, the above description applies to both server computers and client computers deployed in a network environment. FIG. 2 illustrates one such exemplary network environment in which the present invention may be employed.

As shown, a Web server 100 is interconnected with a number of other server computers, such as a database server 110, a file server 120, and a mail server 130. The Web server 100 includes a document store 140a. Similarly, the database server, file server, and mail server include document stores 140b, 140c and 140d, respectively. In this example, the Web server, database server, file server, and mail server are part of a local area network 150. A wide area communications network 160 (e.g., the Internet) permits remote Web sites 170 and client computers 20a, 20b, 20c, etc. (each equipped with a browser 35-1), to gain access to Web server 100, e.g., to search for documents or other forms of electronically stored information.

The Web server 100 contains a Web crawler program 200, which is employed as described above to gather information for use in a searchable index. In addition, as shown, the Web server contains a search engine 300 and a persistent store 400 for the index, History Table and log files. The Web crawler program 200 searches for electronic documents distributed on one or more computers connected to the Web server 100, including servers 110, 120 and 130, as well as remotely connected Web site(s) 170. Although the network 150 is shown as a local area network, it may be a WAN or a combination of networks that allow the Web server 100 to communicate with other computers having associated document stores available for indexing.

The Web crawler program 200 searches its own document store 140a and those of remote servers for electronic documents. It retrieves documents and associated data. The contents of the electronic documents, along with associated data, can be used in a variety of ways. For example, the Web crawler 200 may pass the information to indexing/search engines 300. The indexing engine 300-1 (see FIG. 3) is a computer program that maintains an index 400-1 of electronic documents. The index is like the index in a book and contains reference information and pointers to electronic documents to which the reference information applies. For example, the index may include keywords and for each keyword a list of addresses. Each address can be used to locate a document that includes the keyword. The index may also include information other than keywords used within the electronic documents. For example, the index may include subject headings or category names, even when the literal subject heading or category name is not included within the electronic document. The type of information stored in the index depends upon the complexity of the indexing engine 300-1, which may analyze the contents of the electronic document and store the results of the analysis.

A client computer, such as computer 20a, includes an OS browser function 35-1 (or separate browser application) that locates and displays documents to a user. When a user at the client computer desires to search for one or more electronic documents, the client computer transmits data to the search engine 300-2 (FIG. 3) requesting a search. At that time, the search engine examines its associated index 400-1 to find documents that may be desired by the user. The search engine may then return a list of documents to the browser 35-1. The user may then examine the list of documents and retrieve one or more desired electronic documents from remote computers.

As will be readily understood, the system illustrated in FIG. 2 is exemplary, and alternative configurations may also be used in accordance with the invention. For example, the Web crawler program 200 and indexing engine and search engines 300 may reside on different computers. Additionally, the Web browser 35-1 and the Web crawler program 200 may reside on a single computer. Further, the indexing and search engines 300 are not required by the present invention. The Web crawler program 200 may retrieve electronic document information for uses other than providing the information to a search engine. As discussed above, the client computer(s) 20a–20c, server computers 100–130, and remote Web site(s) 170 may communicate through any type of communications network or medium.

Incremental Web Crawling Method

Figure 3:
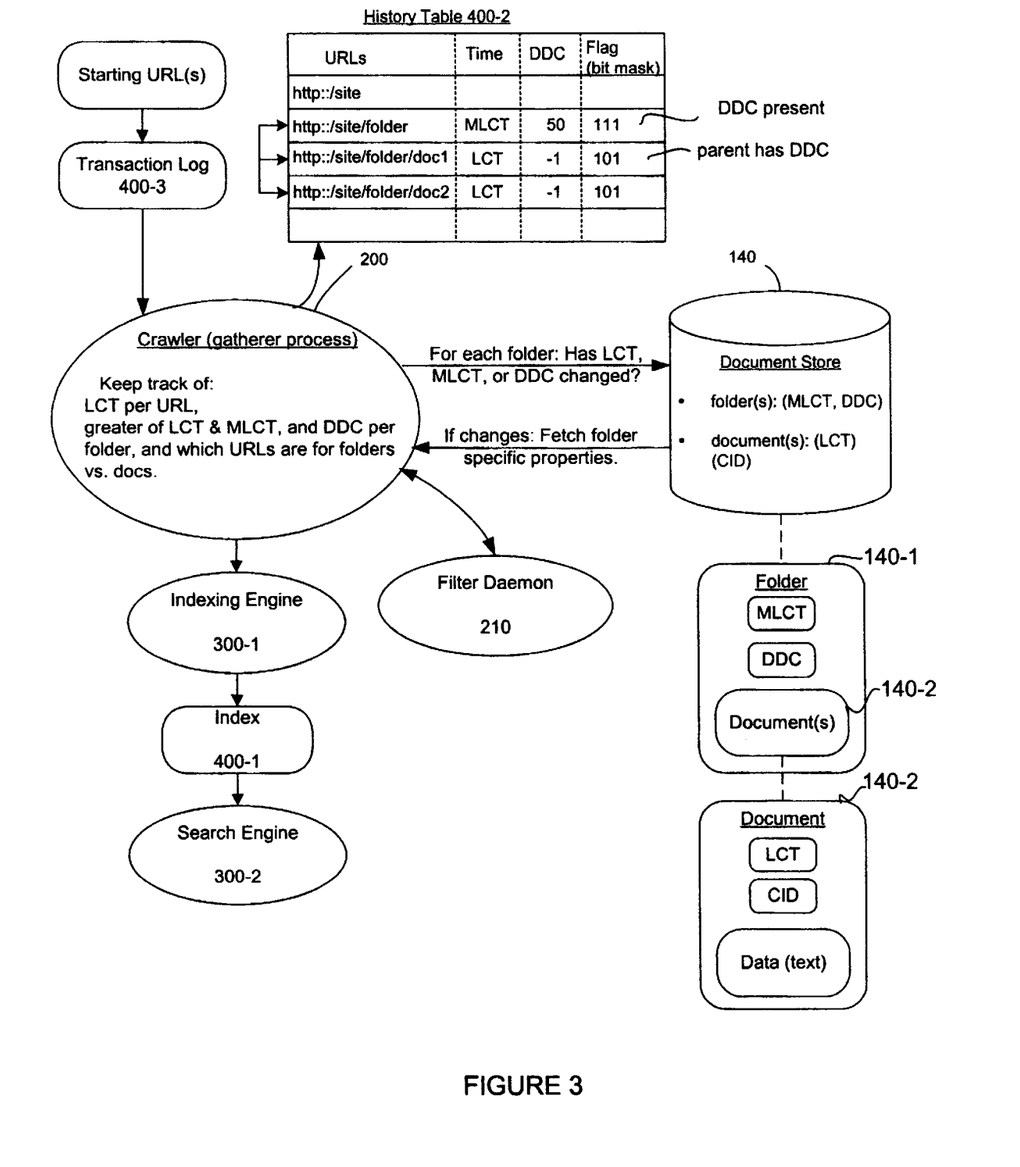
FIG. 3 is a schematic diagram of a crawler application in accordance with the present invention.

FIG. 3 schematically depicts, from a functional perspective, a presently preferred implementation of the inventive Web crawler 200, which includes a "gatherer" process that crawls the Web and gathers information pertaining to electronic documents. The gatherer process is invoked by passing it one or more starting document address specifications, i.e., URLs. The starting URLs serve as seeds, telling the gatherer where to begin its Web crawling process. A starting URL can be a universal naming convention (UNC) directory, a UNC path to a file, or an HTTP path to a URL. The gatherer process inserts the starting URLs into a transaction log 400-3, which maintains a list of URLs that are currently being processed or have not yet been processed. The transaction log 400-3 functions as a queue, and is called a "log" because it is preferably implemented as a persistent file kept in a nonvolatile storage device, such as a disk, to enable recovery after a system failure. The transaction log 400-3 may maintain a small in memory cache for quick access to the next transactions.

The gatherer process also maintains the History Table 400-2, as shown, which contains an ongoing list of all URLs that have been searched during the current Web crawl and previous crawls. The History Table 400-2 also includes a timestamp for each document. The timestamp is a MLCT for folders and a LCT for documents (although a folder can have an LCT that is updated whenever any properties of the folder itself, such as description, etc., change). In addition, the History Table includes a deleted count (DDC) for each folder. As shown, the DDC may be set to a prescribed number, such as minus one (−1), for documents that are not folders. (A folder is a collection of pointers to simple documents (files) or other folders. It is defined by the document store's implementation as a special object that allows access by a client of the store.) Further, the History Table 400-2 preferably includes a flag or bit mask to indicate which items in the History Table have a corresponding DDC, i.e., which are folders, and which items have a parent with a DDC, i.e., which are documents contained within a folder. (As discussed in co-pending application Ser. No. 09/343,511 and now U.S. Pat. No. 6,547,829, the History Table may also be augmented with a content identifier (CID) for use in identifying duplicate documents.)

The crawler's gatherer process includes one or more worker threads that process each URL. The worker thread(s) retrieves a URL from the transaction log 400-3 and passes it to a filter daemon 210. The filter daemon 210 is a process that uses the URL to retrieve the electronic document at the address specified by the URL. The filter daemon 210 uses the access method specified by the URL to retrieve information from the document store 140. For example, a folder 140-1 may contain a document 140-2 to be retrieved. If the access method is HTTP, for example, the filter daemon 210 uses HTTP commands to retrieve the folder or document. If the access method specified is FILE, the filter daemon uses file system commands to retrieve the corresponding documents. The File Transfer Protocol (FTP) is another other well known access method that the filter daemon may use. Other access protocols may also be used in conjunction with the invention.

After retrieving a document 140-2, the filter daemon 210 parses the document and returns a list of text and properties. An HTML document includes a sequence of properties or "tags" that contain information. The information may be text to be displayed in by browser 35-1 (FIG. 2). The information may also be metadata describing the formatting of text. The information within tags may also contain hyperlinks to other documents. A hyperlink includes a specification of a URL. If the tag containing a hyperlink is an image, the browser uses the hyperlink to retrieve the image and render it on the Web page. Similarly, the hyperlink may specify the address of audio data. If a hyperlink points to audio data, the Web browser program retrieves the audio data and plays it. An "anchor" tag specifies a visual element and a hyperlink. The visual element may be text or a hyperlink to an image. When a user selects an anchor having an associated hyperlink in a browser, the browser automatically retrieves an electronic document at the address specified in the hyperlink.

Tags may also contain information intended for a search engine. For example, a tag may include a subject or category within which the electronic document falls, to assist search engines that perform searches by subject or category. The information contained in tags is referred to as "properties" of the electronic document. An electronic document may therefore be considered to comprise a set of properties and text. The filter daemon 210 returns the list of properties and text within an electronic document to the worker thread of the gatherer process.

As discussed above, an electronic document may contain one or more hyperlinks. Therefore, the list of properties includes a list of URLs that are included in hyperlinks within the electronic document. The worker thread passes this list of URLs to the History Table 400-2. When a new or modified electronic document is retrieved, the History Table checks each hyperlink URL to determine if it is already listed within the History Table. URLs that are not already listed are added to the History Table and are marked as not having been crawled during the current crawl. They are also added to the transaction log, 400-3 to be subsequently processed by a worker thread. The History Table 400-2 may also include crawl number crawled data and crawl number modified data (not shown). The crawl number crawled data indicates the most recent crawl number during which the URL was processed. The crawl number modified data indicates the most recent crawl number during which a modified electronic document was retrieved. Use of the History Table works to prevent the same URL from being processed more than once during a crawl. The worker thread passes the list of properties and text to the indexing engine 300-1, which in turn creates the index 400-1 to be used by the search engine 300-2 in subsequent searches.

The present invention is more particularly directed to the use of a document store's ability to provide extra properties for each document and/or folder. Such extra properties include local commit time (LCT), maximum local commit time (MLCT) and deleted documents count (DDC). In accordance with the present invention, the document store 140 provides the three extra properties LCT, MLCT and DDC for each folder, and a LCT for each document. The LCT for the document is similar to the last modified timestamp. The difference is that if an older copy of the document is written over a newer copy, the last modified timestamp will be older than the last modified timestamp of the previous document, and the LCT will be newer. In other words, the LCT always increases and preferably cannot be set by the user. The LCT for the folder changes whenever any folder specific properties (such as the description of the folder) are modified; and the MLCT for the folder changes whenever any contained document's LCT changes (i.e., whenever a document is modified or created). The deleted documents count, or DDC, of the folder changes whenever a document is deleted. The LCT of a document changes when a document is modified in any way. The gatherer process of the crawler 200 keeps track of local commit times and deleted counts per URL. For folders, the gatherer process keeps a single timestamp, namely, the LCT or MLCT, whichever is greater or more recent. (As mentioned, the LCT of a folder changes when a folder specific property changes. It does not change if any documents in the folder change, or if any documents are created or deleted in the folder. The crawler may be interested in the folder properties for indexing purposes.) The gatherer process, with the use of the flags or bit masks discussed above, also keeps track of which URLs correspond to folders as opposed to documents. During an incremental crawl, the gatherer process iterates over its history of URLs, but only picks out folders. For each folder in the history, it asks the document store if the folder's LCT/MLCT and DDC have changed. If the LCT has changed, the crawler fetches the folder specific-properties. If nothing else changed, no more work needs to be done. If the MLCT has changed, the gatherer enumerates items (documents) in the folder and only accesses those with a LCT more recent than the timestamp that the crawler has in its history file for the folder. If both LCT and MLCT change, the crawler performs both operations—i.e., filtering of folder properties and executing a query to check for documents with greater LCT. (The crawler may execute a query on the folder that only returns the URLs of changed documents. This is possible if the store supports SQL-like queries. In this case, the crawler does not have to enumerate all items in the folder, which reduces network round-trips.) If the DDC has changed, the gatherer runs a mini-iterator over the crawl history in the folder being checked to determine which documents no longer exist. For example, the gatherer may obtain a list of all URLs in the folder, and mark them in the History Table. After the folder is processed, it may run a mini-iterator on the folder to find any unmarked URLs and delete them from the History Table and from the index. The unmarked URLs would correspond to items that have been deleted from the folder.

Figure 4:
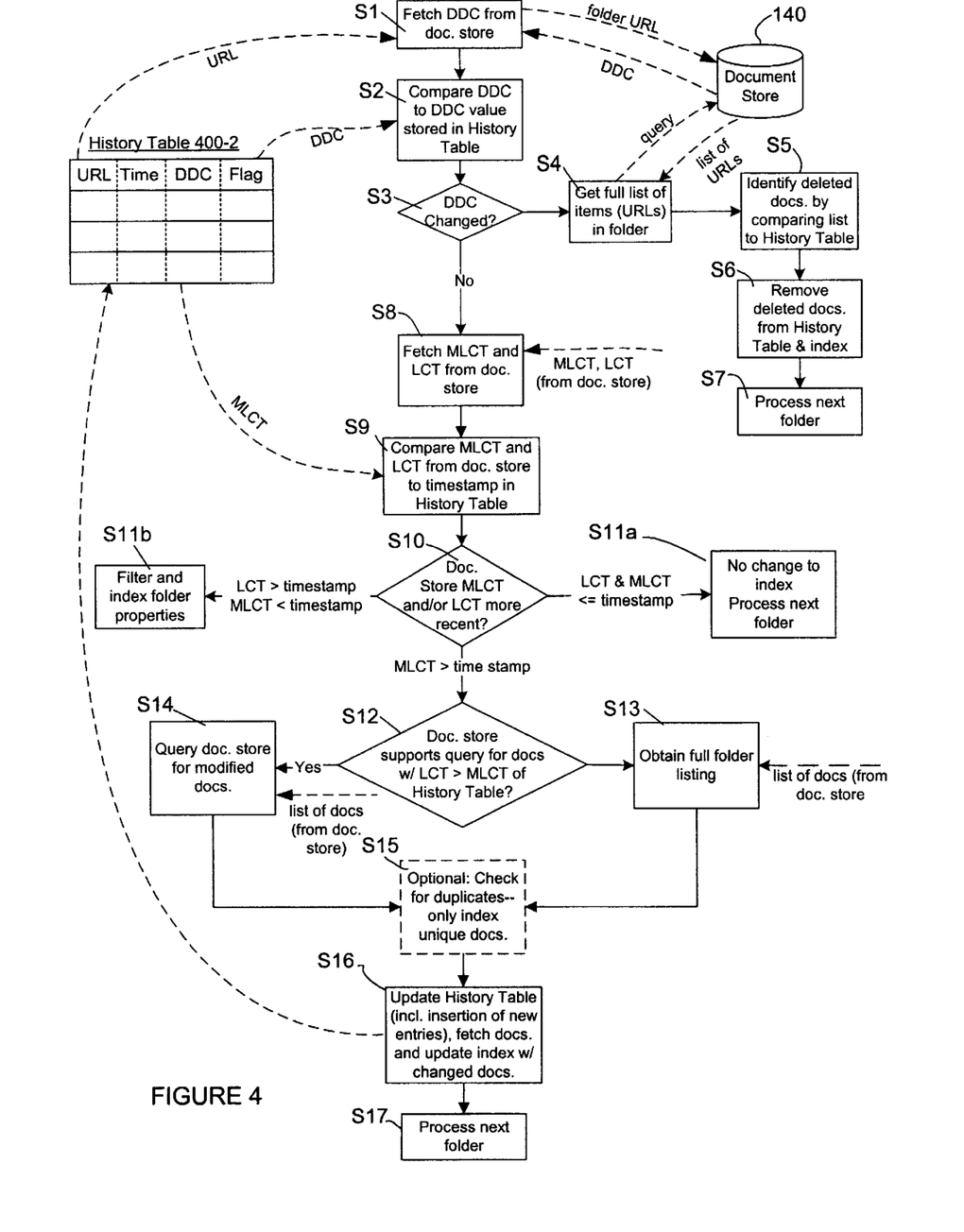
FIG. 4 is a flowchart of a method for performing an incremental crawl in accordance with the present invention.

The incremental crawl process of the present invention will now be summarized with reference to the flowchart of FIG. 4. The overall purpose of the incremental crawl is to detect new, modified or deleted documents. If any items are deleted, the store does not keep an exact listing of the deleted items. Instead, it just keeps the DDC. A modified DDC indicates to the gatherer that there were some deletes. To learn what URLs were deleted, the gatherer obtains a full listing of the folder and compares it with its own listing.

For each folder in the document store 140, the crawler uses the corresponding URL of the folder to fetch the DDC for that folder (step S1). The DDC obtained from the document store is then compared with the corresponding DDC obtained from the History Table 400-2 (step S2). If the DDC has changed (i.e., if the DDC from the document store is greater than the DDC from the History Table), steps S4 through S7 are performed. Otherwise, steps S8 through S17 are performed.

In step S4, the crawler obtains from the document store a full list of the items, or URLs, in the folder. In step S5, the deleted documents are identified by comparing the full list to a corresponding list of documents in the folder from the History Table 400-2. In step S6, the deleted documents are removed from the History Table 400-2 and from the index 400-1 (FIG. 4). The next folder identified in the History Table is then processed as indicated at step S7. The next folder is processed by repeating the process at step S1. In a particular implementation of the present invention, for every URL obtained from the folder listing (step S4), the gatherer marks the URL in the History Table as being present in the folder, and also compares the timestamp from the folder listing with the timestamp for that URL in the History Table. If the timestamp in the listing is greater, the gatherer creates a new transaction for the URL (the timestamp needs to be updated). If the URL is not in the History Table, the gatherer inserts the URL and creates a transaction (this is a new URL). After obtaining the folder listing, the gatherer iterates over the history for that folder and creates delete transactions for every URL that was unmarked while processing the folder listing. These URLs are deleted from the History Table and subsequently from the index.

If it is determined, in step S3, that the DDC has not changed, the crawler fetches the MLCT and LCT for the current folder from the document store 140 (step S8). In step S9, the values of the MLCT and LCT obtained from the document store are compared to the values of the timestamp in the History Table 400-2. At step S10, the crawler determines whether both the LCT and MLCT are older than (less than or equal to) the timestamp in the History Table. If so, then step S11a is performed (the next folder is processed without changing the index). In addition, at step S10, the crawler determines whether the LCT is greater than the timestamp but the MLCT is not. In this case, only the folder properties are filtered and indexed without iterating over individual documents in the folder. This is step S11b. If the MLCT is greater than the timestamp in the history table, then steps S12 through S17 are performed. If both the LCT and MLCT have changed, then the gatherer performs both re-indexing of the folder properties (not shown in FIG. 4) and steps S12 through S17.

In step S12, the crawler determines whether the document store 140 permits or supports a query for documents having a LCT value that is greater (i.e., more recent) than the MLCT for the folder in the History Table. Step S13 is performed if this function is not supported by the document store. In step S13, the crawler uses a standard incremental crawl to obtain from the document store a full list of documents in the folder. On the other hand, if the document store supports queries for documents having a LCT value greater than the timestamp for the folder in the History Table, the crawler uses such a query to obtain a list of the documents that have been modified since the time indicated by the MLCT (step S14). (Note that, if the folder supports the DDC, it is not necessary to check every item in the folder. Therefore, step S13 may be linked to step S1 if the DDC is not available for the folder.)

Once the list of modified documents has been obtained, either with step S13 or S14, the crawler optionally checks for duplicate documents using the process indicated by step S15. A presently preferred duplicate detection procedure is discussed in greater detail in Ser. No 09/343,511 and now U.S. Pat No. 6,547,829. This procedure is employed to avoid fetching from the document store and indexing replicas of documents that are already represented in the index 400-1 (FIG. 3).

In step S16, the History Table 400-2 is updated with information concerning any new, modified or deleted document(s), and then a copy of the new or modified document(s) is retrieved from the document store 140 so that the index 400-1 can be updated. Thereafter, as indicated in the box for step S17, another folder is processed by repeating the above-described process at step S1.

Having the document stores on a network provide the three properties LCT, MLCT and DDC is a very small overhead in comparison to the improved performance of the incremental crawl. The present invention avoids the need to check the time stamp for each and every document in the document store to identify changes to the document store. This dramatically improves the efficiency of incremental crawls and like processes that are used to manage document stores. This is also important for the case where the crawler is configured to monitor for change notifications from the store, because in that case an incremental crawl is used to synchronize with the store at startup. Reducing the startup overhead makes the system available faster.

In sum, the present invention provides an improved Web/document crawling method and system. An important feature of the preferred embodiments of the invention is the use of three simple properties (LCT, MLCT and DDC), that are easily provided by a document store to enhance the efficiency and usefulness of a crawler application. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of database and database management applications, including electronic messaging systems or mail severs. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic diskette) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A computer-based method for performing an incremental crawl of a computer-readable document store in a manner that facilitates an efficient determination of whether and how the document store has been incremented from a prior state, comprising the following acts:

(a) determining from the document store whether a deleted documents count (DDC) for a first folder has changed from a value of the DDC as determined during a previous crawl of the document store;

(b) if the DDC has changed, identifying the documents that have been deleted from the first folder subsequent to the previous crawl; and (c) if the DDC has not changed, determining whether a maximum local commit time (MLCT) associated with the first folder is later than a value of the MLCT as determined during the previous crawl, and, if it is later, identifying the documents that have been added to the folder or modified subsequent to the previous crawl.

2. A method as recited in claim 1, further comprising maintaining a History Table in which the DDC and MLCT are stored in association with address specifiers for folders in the document store.

3. A method as recited in claim 2, wherein the document store provides the DDC and MLCT as well as a local commit time (LCT) for documents in the document store, and wherein, in the History Table, an LCT is stored for documents, and max(LCT, MLCT) and a DDC are stored for folders.

4. A method as recited in claim 3, wherein the History Table also includes a flag to indicate which address specifiers correspond to folders having a DDC value stored in the History Table, and which address specifiers correspond to documents associated with a folder having a DDC value stored in the History Table.

5. A method as recited in claim 2, comprising, for each folder, storing in the History Table the LCT or MLCT of the folder, whichever is greater.

6. A method as recited in claim 1, wherein the method is executed by a server computer coupled by a network to the document store.

7. A method as recited in claim 1, further comprising providing an index of the documents in the document store, and updating the index to reflect any deleted, modified, or new documents that are identified during the incremental crawl of the document store.

8. A method as recited in claim 1, wherein, during the incremental crawl, documents or folders that are determined, through the DDC, MLCT and LCT, not to have been added or changed since the previous crawl are not fetched from the document store.

9. A method as recited in claim 1, wherein, during the incremental crawl, timestamps for documents that are determined, through the MLCT of the associated folder for each document, not to have been added or changed since the previous crawl are not fetched from the document store.

10. A method as recited in claim 1, wherein the method is employed in connection with a Web crawler application.

11. A method as recited in claim 1, wherein the method is employed in connection with a mail server application.

12. A method as recited in claim 1, wherein the method is employed in connection with a directory service.

13. A method as recited in claim 1, wherein the method is employed in connection with a system requiring indexing or one-way replication of a document store.

14. A computer-executable crawler application stored on a computer readable storage medium that is accessible to a server computer coupled by a network to a document store, wherein the document store contains a plurality of electronic documents and folders containing references to one or more documents, and wherein the document store provides local commit times (LCTs) and maximum LCTs (MLCTs) for documents and folders in the document store and deleted documents counts (DDCs) for folders in the document store, comprising:

(a) executable code for determining whether the DDC for a first folder has changed from a value of the DDC as determined during a previous crawl of the document store, and, if the DDC has changed, identifying the documents that have been deleted from the first folder since the previous crawl; and (b) executable code for determining whether the MLCT associated with the first folder is later than a value of the MLCT as determined during the previous crawl, and, if it is later, identifying the documents that have been added to the folder or modified subsequent to the previous crawl.

15. A crawler application as recited in claim 14, wherein the DDC and MLCT provided by the document store are stored by the crawler application in a History Table in association with address specifiers for folders in the document store.

16. A crawler application as recited in claim 15, wherein, in the History Table, an LCT is stored for documents, and max(LCT, MLCT) and a DDC are stored for folders.

17. A crawler application as recited in claim 16, wherein the History Table also includes a flag to indicate which address specifiers correspond to folders having a DDC value stored in the History Table, and which address specifiers correspond to documents associated with a folder having a DDC value stored in the History Table.

18. A crawler application as recited in claim 15, wherein, for folders, the crawler stores in the History Table the LCT or MLCT of the folder, whichever is greater.

19. A computer system comprising:

a server computer; and a document store operatively coupled to the server computer, wherein the document store contains a plurality of electronic documents and folders containing references to one or more documents, and wherein the document store provides properties including local commit times (LCTs) and maximum LCTs (MLCTs) for documents and folders in the document store and deleted documents counts (DDCs) for folders in the document store;

wherein the LCT, MLCT and DDC properties are provided for each folder, and a LCT is provided for each document; wherein the LCT for a folder changes whenever a folder specific property is modified; wherein the MLCT for the folder changes whenever any contained document's LCT changes; and wherein the LCT of a document changes when a document is modified.

20. A system as recited in claim 19 and further comprising:

a computer readable storage medium operatively coupled to the server computer; and a computer-executable crawler application stored on the computer readable storage medium.

21. A computer system comprising:

a server computer;

a document store operatively coupled to the server computer, wherein the document store contains a plurality of electronic documents and folders containing references to one or more documents, and wherein the document store provides local commit times (LCTs) and maximum LCTs (MLCTs) for documents and folders in the document store and deleted documents counts (DDCs) for folders in the document store;

a computer readable storage medium operatively coupled to the server computer; and a computer-executable crawler application stored on the computer readable storage medium;

wherein the crawler application, when executed by the server, causes the following acts to be carried out by the server:

determining whether the DDC for a first folder has changed from a value of the DDC as determined during a previous crawl of the document store, and, if the DDC has changed, identifying the documents that have been deleted from the first folder since the previous crawl; and determining whether the MLCT associated with the first folder is later than a value of the MLCT as determined during the previous crawl, and, if it is later, identifying the documents that have been added to the folder or modified subsequent to the previous crawl.

22. A system as recited in claim 21, wherein the server computer comprises a member of a group consisting of a Web server, a mail server, a file server and a database server.

23. A computer-readable document store, comprising a plurality of electronic documents and folders containing references to one or more documents, wherein the document store includes properties including local commit times (LCTs) and maximum LCTs (MLCTs) for documents and folders in the document store and deleted documents counts (DDCs) for folders in the document store; wherein the LCT, MLCT and DDC properties are provided for each folder, and a LCT is provided for each document; wherein the LCT for a folder changes whenever a folder specific property is modified; wherein the MLCT for the folder changes whenever any contained document's LCT changes; and wherein the LCT of a document changes when a document is modified.

* * * * *

UNITED STATES PATENT AND TRADEMARK OFFICE
CERTIFICATE OF CORRECTION

PATENT NO. : 6,631,369 B1  Page 1 of 1
DATED : October 7, 2003
INVENTOR(S) : Dmitriy Meyerzon et al.

It is certified that error appears in the above-identified patent and that said Letters Patent is hereby corrected as shown below:

<u>Title page,</u>
Item [56], References Cited, OTHER PUBLICATIONS, "Schwartz" reference, delete "a☐☐" and insert -- a --.

Signed and Sealed this

Second Day of March, 2004

JON W. DUDAS
*Acting Director of the United States Patent and Trademark Office*